(12) United States Patent
Lee et al.

(10) Patent No.: US 11,935,175 B2
(45) Date of Patent: Mar. 19, 2024

(54) APPARATUS, METHOD, AND COMPUTER-READABLE MEDIUM FOR IMAGE PROCESSING USING VARIABLE-PRECISION SHADING

(71) Applicant: HUAWEI TECHNOLOGIES CO., LTD., Guangdong (CN)

(72) Inventors: Andrew Siu Doug Lee, Toronto (CA); Tyler Bryce Nowicki, Mississauga (CA); Guansong Zhang, Markham (CA); Yan Luo, Markham (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 63 days.

(21) Appl. No.: 17/715,807

(22) Filed: Apr. 7, 2022

(65) Prior Publication Data

US 2023/0326117 A1    Oct. 12, 2023

(51) Int. Cl.
*G06T 15/00* (2011.01)
*G06T 1/20* (2006.01)
*G06T 17/20* (2006.01)

(52) U.S. Cl.
CPC .............. *G06T 15/005* (2013.01); *G06T 1/20* (2013.01); *G06T 17/20* (2013.01)

(58) Field of Classification Search
CPC ......... G06T 1/20; G06T 15/005; G06T 15/80; G06T 17/20
USPC ....................................................... 345/426
See application file for complete search history.

(56) References Cited

U.S. PATENT DOCUMENTS

| | | | | |
|---|---|---|---|---|
| 7,385,607 | B2* | 6/2008 | Bastos | G06T 15/005 345/506 |
| 8,194,083 | B2* | 6/2012 | Shreiner | G06T 15/005 345/505 |
| 2009/0265528 | A1* | 10/2009 | Du | G06F 9/3887 712/E9.016 |
| 2017/0124757 | A1* | 5/2017 | Sathe | G06T 15/04 |
| 2018/0315159 | A1* | 11/2018 | Ould-Ahmed-Vall | G06F 9/5044 |
| 2020/0380754 | A1* | 12/2020 | Nevraev | G06T 1/20 |
| 2021/0358191 | A1* | 11/2021 | Frascati | G06T 15/005 |

OTHER PUBLICATIONS

D.A. Siverstein and J.E. Farrell, Academic Paper, "The relationship between Image Fidelity and Image Quality", published in Proceedings of the 3rd IEEE International Conference on Image Processing, 1996, pp. 881-841, vol. 1.

* cited by examiner

*Primary Examiner* — Jacinta M Crawford
(74) *Attorney, Agent, or Firm* — Locke Lord LLP; Tim Tingkang Xia, Esq.

(57) ABSTRACT

There is described a method of shading a group of pixels in a fragment shader in a raster graphics pipeline. At least one first pilot pixel of the group of pixels is shaded under a first precision. At least one second pilot pixel of the group of pixels is shaded under a second precision. An error value representing a difference between the first and second pilot pixels is calculated. At least one other pixel of the group of pixels is shaded under the first precision if the error value is greater than an error threshold. The at least one other pixel is shaded under the second precision if the error value is smaller than the error threshold.

17 Claims, 6 Drawing Sheets

APPARATUS, METHOD, AND COMPUTER-READABLE MEDIUM FOR IMAGE PROCESSING USING VARIABLE-PRECISION SHADING

RELATED APPLICATIONS

This is the first patent application pertaining to the disclosed technology.

FIELD

The present disclosure relates to methods, computer-readable media, and computing devices for shading a group of pixels in a fragment shader in a raster graphics pipeline.

BACKGROUND

In computer-graphics processing, a computer-graphics model may be basically considered a collection of data representing or otherwise defining an image or part of an image. Typically, a computer-graphics model is defined according to many interconnected polygons such as triangles or quadrilaterals. The corners of these polygons are known as vertices, and each polygon contains a number of pixels whose positions are defined according to the relative positions of the vertices. One job of the computer-graphics processing is to convert a computer-graphics model into an image suitable for display through a process known as rasterization which may be performed by one or more central processing units (CPUs) and/or one or more graphics processing units (GPUs).

During the rasterization process, the computer-graphics model is first processed by a vertex shader of, for example, a GPU which processes the vertices of each polygon. For example, the vertex shader may determine a color that is to be associated with each vertex of the polygon. The output of the vertex shader is then passed to a rasterizer. The output of the rasterizer is passed to a fragment shader of the GPU, whereat each pixel is further processed according to the particular functions defined in the fragment shader. This overall process occurs in what is referred to as a rasterization pipeline.

The fragment shader generally accounts for most of the power consumption in the rasterization pipeline. Moreover, bottlenecks at the fragment shader can reduce the speed at which the computer-graphics model is rasterized and, as a result, reduce the overall efficiency of the graphics processing.

SUMMARY

Generally, according to some embodiments of the disclosure, there are described methods of shading a group of pixels in a fragment shader in a raster graphics pipeline. A fragment shader may be responsible for calculating the color of each pixel. The computation of the color output may be performed at different levels of precision. Reducing the precision may increase the performance of the graphic processing unit (GPU). Moreover, using lower precision calculations may result in lower power usage by the GPU. However, reducing the precision of the calculations may result in a reduction in the quality of the images output by the fragment shader. Some embodiments of the disclosure are aimed at comparing a lower-precision fragment shader (LPFS) to a higher-precision fragment shader (RPFS) to determine if the LPFS may be used without substantially reducing the fidelity of the image. Herein, the higher precision may be a "regular" precision that is commonly or generally preferably used, and the lower precision may be a precision that is sufficiently lower than the higher precision and the use thereof may lead to a lower cost computation.

Those skilled in the art will appreciate that a shader may be implemented using any suitable manner such as implemented as a hardware component, a software component or program, or a combination thereof. Moreover, in some embodiments, the LPFS and RPFS described below may be separate hardware or software shaders implemented as hardware components or software components with one operating in high precision and the other in low precision. In these embodiments, the LPFS and RPFS may be separate hardware shaders. Alternatively, the LPFS and RPFS may be separate software shaders. Yet alternatively, one of the LPFS and RPFS may be a hardware shader and the other thereof may be a software shader.

In some other embodiments, the LPFS and RPFS described below may be the same hardware or software shader with adjustable precisions, for example, under the instructions of input precision-signals, to act as the LPFS or RPFS as needed.

Herein, the term "image fidelity" or simply "fidelity" refers to the ability of a process to render an image accurately, without any visible distortion or information loss and is related to the perceptible visual quality of an image. The image fidelity may be inferred by the ability to discriminate between two images. While an image quality may sometimes be inferred by the preference for one image over another (see academic paper entitled "The relationship between image fidelity and image quality," by D. A. Silverstein and J. E. Farrell, published in Proceedings of 3rd IEEE International Conference on Image Processing, 1996, pp. 881-884 vol. 1"), the term "image quality" may be used interchangeably in this disclosure.

Herein, the term "fragment" and "pixel" may be used interchangeably, and a fragment shader may also be denoted a "pixel shader".

In particular, according to some embodiments of the disclosure, the pixels are grouped into one or more variable-precision groups of pixels. A pilot pixel (also denoted a "pilot fragment") is selected from the variable-precision group of pixels. Both the LPFS and the RPFS may be used to process the pilot pixel. The output of the two shaders are compared to determine an error value representing the difference between the output of the LPFS and the RPFS. If the error value is greater than an error threshold, the RPFS is selected for shading the remaining pixels in the variable-precision group. If the error value is less than an error threshold, then the LPFS is selected for shading the remaining pixels in the variable-precision group. Thus, a certain degree of image fidelity is maintained by only using the LPFS on pixels where doing so will not substantially degrade the perceptible visual quality of the image. As most pixels may be shaded by the LPFS, the pixel-shading time is significantly reduced, thereby giving rise to performance improvement.

While processing the pilot pixel may cause some overhead, such overhead may be relatively small to the potential performance gains.

For example, in the embodiments where the LPFS and RPFS are implemented as the same precision-adjustable shader or as different software shaders without using parallel computing, processing the pilot pixel may cause some overhead in computational time. However, such overhead may be small and affordable due to the small number of the pilot pixels (compared to the total number of pixels to be shaded).

In embodiments where the LPFS and RPFS are implemented as different hardware-shaders, processing the pilot pixel may cause some overhead in hardware resource. However, those skilled in the art will appreciate that, once one of the LPFS and RPFS is selected for shading the remaining pixels in the variable-precision group, the other of the LPFS and RPFS is no longer used and may be used for other shading tasks or shading tasks of other applications.

In embodiments where the LPFS and RPFS are implemented as different software-shaders using parallel computing technologies, processing the pilot pixel may cause some overhead in memory usage and computational power. However, those skilled in the art will appreciate that, once one of the LPFS and RPFS is selected for shading the remaining pixels in the variable-precision group, the other of the LPFS and RPFS is no longer used, and the memory and computational power assigned thereto may be released.

According to a first aspect of the disclosure, there is described a method of shading a group of pixels in a fragment shader in a raster graphics pipeline, comprising: shading at least one first pilot pixel of the group of pixels under a first precision; shading at least one second pilot pixel of the group of pixels under a second precision; calculating an error value representing a difference between the first and second pilot pixels; shading at least one other pixel or fragment of the group of pixels under the first precision if the error value is greater than an error threshold; and shading the at least one other pixel under the second precision if the error value is smaller than the error threshold.

Therefore, the other pixels or fragments of the group of pixels are only shaded using the LPFS if doing so is unlikely to reduce the fidelity of the image. This is because the other pixels of the group of pixels share a spatial relationship with the pilot pixel. Consequently, if the LPFS does not reduce the fidelity of the pilot pixel, it is unlikely to reduce the fidelity of the other pixels in the group of pixels.

The first pilot pixel and the second pilot pixel may be neighboring pixels. That is, the first pilot pixel and the second pilot pixel may be adjoining to one another. Alternatively, the first pilot pixel and the second pilot pixel may be the same pixel. That is, the same pixel may be used as both the first pilot pixel and the second pilot pixel, such that the same pixel is shaded under two different precisions.

Shading the at least one first pilot pixel under a first precision may comprise using a first fragment shader to shade the at least one first pilot pixel, and shading the at least one second pilot pixel under a second precision may comprise using a second fragment shader to shade the at least one second pilot pixel.

Shading the at least one first pilot pixel may comprise obtaining a first color value, and shading the least one second pilot pixel may comprise obtaining a second color value.

There may exist a spatial relationship among at least two pixels of the group of pixels. By having a spatial relationship between the pixels of the group of pixels, it is possible to infer whether using the LPFS on one pixel will reduce the fidelity of the image based on whether using the LPFS on another pixel reduces the fidelity of the image. It is possible to infer information about one pixel based on information about another pixel.

Calculating the error value may comprise calculating the magnitude of the difference between the first pilot pixel and the second pilot pixel by using, for example, the root-mean-square of the difference therebetween. The first pilot pixel may have a first color value and the second pilot pixel may have a second color value. In some embodiments, the color values may be one or more values between 0 and 255 or values within any other suitable numerical range. Calculating the magnitude of the difference between the first pilot pixel and the second pilot pixel may comprise calculating the magnitude of the difference between the first color value and the second color value. In some embodiments, the color values are between 0 and 255, the error threshold may be a number greater than or equal to 5 and less than or equal to 20.

The group of pixels may have a variety of shapes or dimensions. For example, the group of pixels may comprise 3 pixels by 3 pixels, 2 pixels by 2 pixels, 1 pixel by 5 pixels, or 3 pixels by 2 pixels. As another example, the shape of the group of pixels may be a rectangle, a square, a circle, or a triangle.

A number of the features of the fragment shader may be user customizable. For example, the error threshold value may be user customizable. That is, the user may increase or decrease the error threshold to adjust the efficiency and image fidelity of the shading. The formula for calculating the error value may be user customizable. The location of the first pilot pixel or the second pilot pixel may be user customizable. That is, the user may select which pixels to use as the pilot pixels. The size of the group of pixels may be user-customizable. The user may select the size and dimensions of the variable-precision group of pixels.

The first pilot pixel may be within a central portion of the group of pixels (e.g. a center pixel), a corner pixel of the group of pixels, or a side pixel of the group of pixels. Any pixel in the group of pixels may be selected as the pilot pixel.

The first fragment shader and the second fragment shader may be combined into a single shader such as a fat shader.

The method may further comprise shading all other pixels of the group of pixels under the first precision if the error value is greater than an error threshold; and shading all other pixels of the group of pixels under the second precision if the error value is smaller than the error threshold.

The second fragment shader may be the first fragment shader having received a precision signal as an input.

The first fragment shader has a precision higher than that of the second fragment shader.

The at least one first pilot pixel may comprise a plurality of pixels, and the at least one second pilot pixel may comprise a plurality of pixels.

According to a further aspect of the disclosure, there is provided a non-transitory computer-readable medium comprising computer program code stored thereon for shading a group of pixels in a raster graphics pipeline, wherein the code, when executed by one or more processors, causes the one or more processors to perform a method comprising: shading at least one first pilot pixel of the group of pixels under a first precision; shading at least one second pilot pixel of the group of pixels under a second precision; calculating an error value representing a difference between the first and second pilot pixels; shading at least one other pixel of the group of pixels under the first precision if the error value is greater than an error threshold; and shading the at least one other pixel under the second precision if the error value is smaller than the error threshold.

The method may furthermore comprise performing any of the operations described above in connection with the first aspect of the disclosure.

According to a further aspect of the disclosure, there is provided a computing device comprising one or more graphics processors operable to perform a method for shading a group of pixels in a fragment shader in a raster graphics pipeline, wherein the method comprises: shading at least one first pilot pixel of the group of pixels under a first precision; shading at least one second pilot pixel of the group of pixels under a second precision; calculating an error value representing a difference between the first and second pilot pixels; shading at least one other pixel of the group of pixels under the first precision if the error value is greater than an error threshold; and shading the at least one other pixel under the second precision if the error value is smaller than the error threshold.

The one or more processors, which may be a graphics processor, may be operable to perform any of the operations described above in connection with the first aspect of the disclosure.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

The present disclosure relates to methods, computer-readable storage media, and computing devices for shading a group of pixels with a fragment shader in a raster graphics pipeline. While various embodiments of the disclosure are described below, the disclosure is not limited to these embodiments, and variations of these embodiments may well fall within the scope of the disclosure.

Embodiments of the disclosure may generally be used in connection with computer-graphics processing involving rasterization, for example as performed in a computer game executed by a computing device such as a mobile device or a computer, as will now be described in further detail in connection with FIG. 1. The following describes the computing device, a graphics processing unit of the computing device, and embodiments for using the graphics processing unit for rasterizing a computer-graphics model for display on a graphical user interface of the computing device.

In some embodiments, the computing device may be a portable computing device, such as a smartphone, a tablet, or a laptop. In other embodiments of this disclosure, the computing device may alternatively be a desktop computer.

Figure 1:
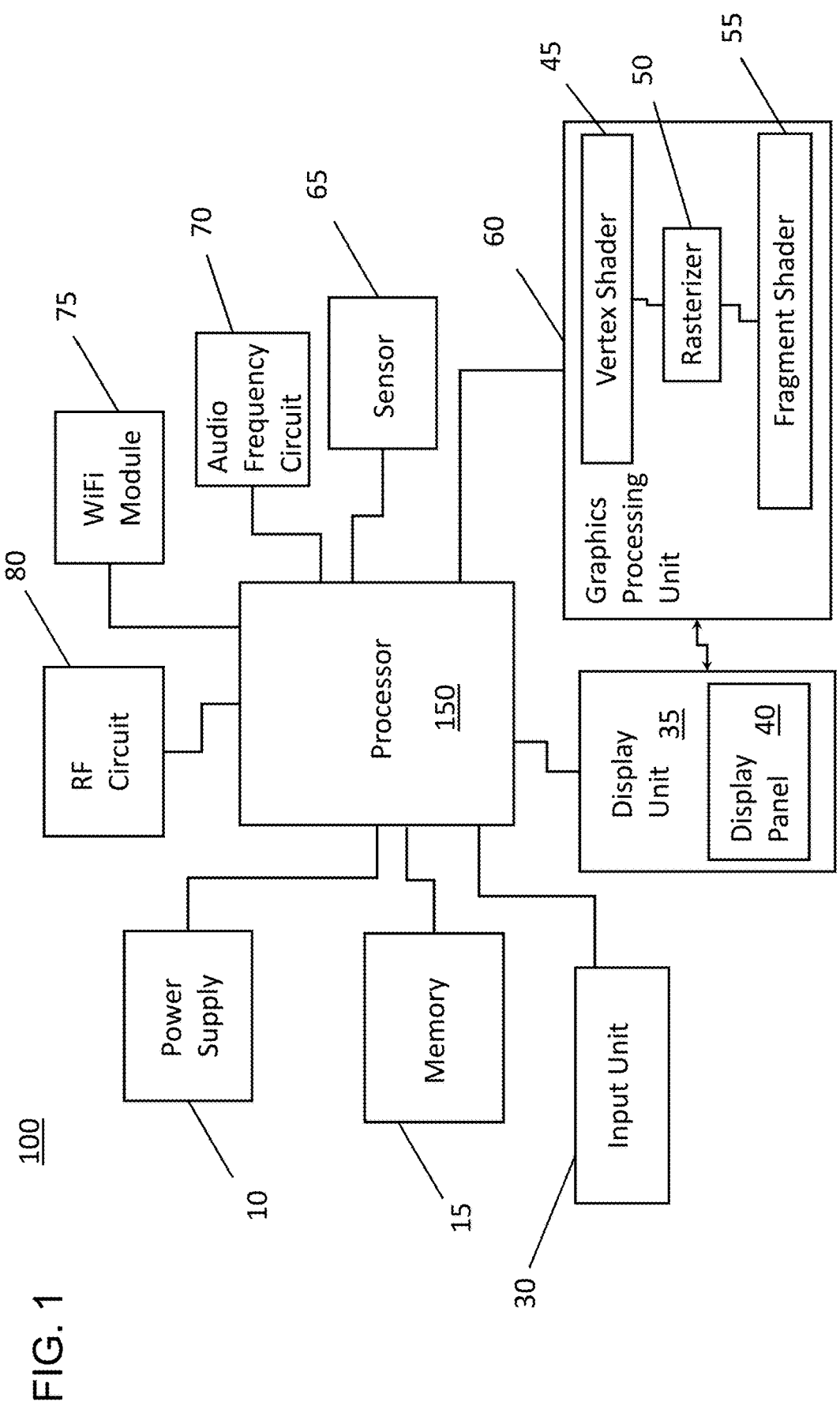
FIG. 1 is a schematic diagram of a computing device, according to an embodiment of the disclosure.

For example, as shown in FIG. 1, the computing device according to embodiments of this disclosure may be a computing device 100. The following specifically describes an embodiment of using computing device 100 as an example. It should be understood that computing device 100 shown in the figure is merely an example of possible computing devices that may perform the methods described herein, and computing device 100 may have more or fewer components than those shown in the figure, or may combine two or more components, or may have different component configurations. Various components shown in the figure may be implemented in hardware, software, or a combination of hardware and software that include one or more signal processing and/or application-specific integrated circuits.

As shown in FIG. 1, computing device 100 may specifically include components such as one or more processors 150, a radio frequency (RF) circuit 80, a memory 15, a display unit 35, one or more sensors 65 such as a fingerprint sensor, a wireless connection module 75 (which may be, for example, a Wi-Fi® module (WI-FI is a registered trademark of Wi-Fi Alliance, Austin, TX, USA)), an audio processing circuit 70, an input unit 30, a power supply 10, and a graphics processing unit (GPU) 60. These components may communicate with each other by using one or more communications buses or signal cables (not shown in FIG. 1). A person skilled in the art may understand that a hardware structure shown in FIG. 1 does not constitute a limitation on computing device 100, and computing device 100 may include more or fewer components than those shown in the figure, may combine some components, or may have different component arrangements.

The following describes in detail the components of computing device 100 with reference to FIG. 1.

Processor 150 is a control center of the computing device 100. Processor 150 is connected to each part of computing device 100 by using various interfaces and lines, and performs various functions of computing device 100 and processes data by running or executing an application stored in memory 15, and invoking data and an instruction that are stored in memory 15. In some embodiments, processor 150 may include one or more processing units. An application processor and a modem processor may be integrated into processor 150. The application processor mainly processes an operating system, a user interface, an application, and the like, and the modem processor mainly processes wireless communication. It should be understood that the modem processor does not have to be integrated in processor 150. For example, processor 150 may be a Kirin chip manufactured by Huawei Technologies Co., Ltd. In some other embodiments of this disclosure, processor 150 may further include a fingerprint verification chip, configured to verify a collected fingerprint.

RF circuit 80 may be configured to receive and send a radio signal in an information receiving and sending process or a call process. Specifically, RF circuit 80 may receive downlink data from a base station, and then send the downlink data to processor 150 for processing. In addition, RF circuit 80 may further send uplink-related data to the base station. Generally, RF circuit 80 includes but is not limited to an antenna, at least one amplifier, a transceiver, a coupler, a low noise amplifier, a duplexer, and the like. In addition, RF circuit 80 may further communicate with another device through wireless communication. The wireless communication may use any communications standard or protocol, including but not limited to a global system for mobile communications, a general packet radio service, code division multiple access, wideband code division multiple access, long term evolution, an SMS message service, and the like.

Memory 15 may be configured to store one or more applications and data. Processor 150 runs the one or more applications and the data that are stored in memory 15, to perform the various functions of computing device 100 and data processing. The one or more applications may comprise, for example, a computer game, or any other application that requires the rendering of computer graphics data for display on a display panel 40 of display unit 35. Memory 15 may include a program storage area and a data storage area. The program storage area may store the operating system, an application required by at least one function, and the like. The data storage area may store data created based on use of the computing device 100. In addition, memory 15 may include a high-speed random access memory, and may further include a non-volatile memory, for example, a magnetic disk storage device, a flash memory device, or another non-volatile solid-state storage device. Memory 15 may store various operating systems such as an iOS® operating system developed by Apple Inc. and an Android® operating system developed by Google Inc. It should be noted that any of the one or more applications may alternatively be stored as part of a cloud-based system, in which case computing device 100 obtains the one or more applications from the cloud.

Display unit 35 may include a display panel 40. Display panel 40 (for example, a touch panel) may collect a touch event or other user input performed thereon by the user of the computing device 100 (for example, a physical operation performed by the user on display panel 40 by using any suitable object such as a finger or a stylus), and send collected touch information to another component, for example, processor 150. Display panel 40 on which the user input or touch event is received may be implemented on a capacitive type, an infrared light sensing type, an ultrasonic wave type, or the like.

Display panel 40 may be configured to display information entered by the user or information provided for the user, and various menus of the computing device 100. For example, display panel 40 may further include two parts: a display driver chip and a display module (not shown). The display driver chip is configured to receive a signal or data sent by processor 150, to drive a corresponding screen to be displayed on the display module. After receiving the to-be-displayed related information sent by processor 150, the display driver chip processes the information, and drives, based on the processed information, the display module to turn on a corresponding pixel and turn off another corresponding pixel, to display a rendered computer-graphics model, for example.

The display module may be configured by using an organic light-emitting diode (OLED). For example, an active matrix organic light emitting diode (AMOLED) is used to configure the display module. In this case, the display driver chip receives related information that is to be displayed after the screen is turned on and that is sent by the processor 150, processes the to-be-displayed related information, and drives some OLED lights to be turned on and the remaining OLEDs to be turned off, to display a rendered computer-graphics model.

Wireless connection module 75 may be configured to provide computing device 100 with network access that complies with a related wireless connection standard protocol. Computing device 100 may access a wireless connection access point by using the wireless connection module 75, to help the user receive and send an e-mail, browse a web page, access streaming media, and the like. Wireless connection module 75 provides wireless broadband internet access for the user. In some other embodiments, wireless connection module 75 may alternatively serve as the wireless connection wireless access point, and may provide wireless connection network access for another electronic device.

Audio processing circuit 70 may be connected to a loudspeaker and a microphone (not shown) and may provide an audio interface between the user and computing device 100. Audio processing circuit 70 may transmit an electrical signal converted from received audio data to the loudspeaker, and loudspeaker the may convert the electrical signal into a sound signal for outputting. In addition, the microphone may convert a collected sound signal into an electrical signal, and audio processing circuit 70 may convert the electrical signal into audio data after receiving the electrical signal, and may then output the audio data to radio frequency circuit 80 to send the audio data to, for example, a mobile phone, or may output the audio data to memory 15 for further processing.

Input unit 30 is configured to provide various interfaces for an external input/output device (for example, a physical keyboard, a physical mouse, a display externally connected to computing device 100, an external memory, or a subscriber identity module card). For example, a mouse is connected by using a universal serial bus interface, and a subscriber identity module (subscriber identity module, SIM) card provided by a telecommunications operator is connected by using a metal contact in a subscriber identity module card slot. Input unit 30 may be configured to couple the external input/output peripheral device to processor 150 and memory 15.

Computing device 100 may further include power supply module 10 (for example, a battery and a power supply management chip) that supplies power to the components. The battery may be logically connected to processor 150 by using the power supply management chip, so that functions such as charging management, discharging management, and power consumption management are implemented.

Computer device 100 further includes a GPU 60. GPU 60 may include a vertex shader 45, a rasterizer 50, and a fragment shader 55. Generally, GPU 60 is a specialized electronic circuit configured to rapidly manipulate and alter memory to accelerate the creation of images in a frame buffer intended for output to display unit 35. GPU 60 includes processing units for evaluating vertex and fragment shaders, such as the vertex shader 45 and fragment shader 55. Vertex and fragment shaders may be provided by the graphics application or its execution environment.

The following embodiments may all be implemented on an electronic device (for example, computing device 100) with the foregoing hardware structure.

A shader may be an executable unit that takes a set of inputs and returns a set of outputs. Shader inputs may either originate from the graphics application or they are the intermediate values that are output from a prior shader. For example, vertex shader 45 outputs are either stored to memory or provided as input to rasterizer 50; rasterizer 50 outputs are provided as input to fragment shader 55; fragment shader 55 outputs are either stored in memory (for example, an image) or in a frame buffer for display on screen by display panel 40. Any values stored to memory may be read by a subsequent shader. For example, fragment shader 55 may write a color value to memory and a subsequent invocation of fragment shader 55 may read the color value from memory.

A shader may include a sequence of arithmetic, logical, and other operations that are evaluated by the vertex shader 45 or fragment shader 55. Each operation takes a set of inputs and returns a set of outputs. For example, the dot product operation outputs the squared length of the input vector. Inputs to the shader may be used as inputs to its operations and outputs from the operations may be outputs from the shader. Operation inputs and outputs may also be intermediate values that are neither a shader input nor a shader output. Intermediate values may be input to another operation. For example, the squared length a vector is an intermediate value when it is subsequently input to a square root operation that outputs the vector's length.

The vertex shader 45 may be configured to take as input a vertex position and output a two-dimensional position on screen, corresponding to the input position. Vertex shader 45 may process each vertex in a two-dimensional primitive (for example, a polygon such as a triangle). Rasterizer 50 may perform rasterization whereby each individual primitive is broken down into discrete elements referred to as fragments (or "pixels") based on the coverage of the primitive (for example, based on the screen space occupied by the two-dimensional primitive). As described above, each fragment or pixel may comprise a plurality of values for a set of attributes (for example color, depth, transparency). Fragment shader 55 may be configured to determine the color and other attributes corresponding to a fragment or pixel. Rasterization produces fragments or pixels that share a spatial relationship to others within or near the boundary of each primitive. As a result of the spatial relationship, it is possible to infer information about one pixel from another pixel. The fragment shader may be run once per pixel.

There will now be described a rasterization pipeline that may be implemented by GPU 60. The rasterization pipeline may be a hardware component in GPU 60 comprising vertex shader 45, rasterizer 50, and fragment shader 55. In particular, a computer-graphics model constructed of many polygons (such as triangles) is input to GPU 60 and processed as now described in further detail. For example, during the execution by processor 150 of a computer game application stored in memory 15, GPU 60 may be called upon by processor 150 to process computer graphics generated as a result of the execution of the computer game. The processing of the computer graphics may comprise GPU 60 rasterizing one or more computer-graphics models, such that the computer-graphics models are converted, for example, from three-dimensional polygons to two-dimensional polygons by the vertex shader 45, then rasterized into fragments or pixels by rasterizer 50 and stored in a frame buffer, then the pixels in the frame buffer are shaded by fragment shader 55, and the frame buffer is displayed on a screen such as the display panel 40.

For the sake of simplicity, rasterization of a computer-graphics model will now be described in connection with a triangle forming part of the computer-graphics model, although it shall be recognized by the skilled person that the computer-graphics model may be defined using any other suitable polygons. A triangle forming part of the computer-graphics model may be processed by GPU 60. The triangle is defined by three points, known as its vertices. Each vertex is defined according to its position, for example a cartesian coordinate in three-dimensional space.

At the start of the rasterization pipeline, vertex input data comprising position data for the vertices is input to vertex shader 45 of GPU 60. Vertex shader 45 processes the vertex input data and generates vertex output data based on the vertex input data. For example, vertex shader 45 may determine both a two-dimensional position and a color for each vertex of the triangle. The color information may be represented by three values (for example, red, green, blue) to match the trichromacy of the human visual system.

Subsequent to the generation of vertex output data, the vertex output data is then input to and processed by rasterizer 50. The vertex output data may comprise both position data and associated color data for the vertices. Rasterizer 50 processes the vertex output data and generates fragment input data based on the vertex output data. In particular, based on the positions of the vertices, rasterizer 50 computes the positions of all pixels contained within the triangle, and interpolates a color to be associated with each pixel based on a weighted average of the position of the pixel relative to the positions of the vertices and the color associated with the vertices. The fragment input data therefore comprises position data and color data for every pixel contained within the triangle.

The fragment input data is then input to a fragment shader 55 which processes the fragment input data and generates fragment output data based on the fragment input data. For example, fragment shader 55 calculates the color for each pixel identified within fragment input data.

Values used by a shader may be represented with different levels of precision. For example, if the red channel of a color is represented by a floating-point number, the floating-point number may have half-precision, single-precision, or double-precision. Half-precision floating point numbers require 16 bits, single-precision floating point numbers require 32 bits, and double-precision floating point numbers require 64 bits. The method for representing a value within a given number of bits is determined by the value's type. For example, integer values may be represented with two's complement while floating point values may be represented with Institute of Electrical and Electronics Engineers (IEEE) Standard for Floating-Point Arithmetic (IEEE 754).

Registers hold a value in memory and the register must have at least as many bits as indicated by the value's precision. For example, a 16-bit value will require at least a 16-bit register. A register's precision refers to the precision of the value it contains. Computer systems may have a wide range of register sizes to store values at various levels of precision. For example, H1 is a half-precision register at memory slot 1 while R15 is a full-precision register stored at memory slot 15. The register occupies a memory slot within an array of registers called a register file. A computing system may provide a separate register files for each level of precision, or a single register file that is shared by all levels of precision.

Instructions in a shader perform arithmetic, logical, and other operations at different levels of precision. For example, the MUL16 instruction indicates that a multiply operation should be performed at half precision. Similarly, the MUL32 instruction indicates that a multiply operation should be performed at full precision. A conversion may be required if the arguments or the destination registers do not match the precision of the instruction.

Reducing the precision of a register or instruction may increase the performance of the GPU 60. In some cases, halving the number of bits may double the performance of the GPU 60. Moreover, using lower precision register or instruction may result in lower power usage by the GPU 60.

However, reducing the precision of a register or instruction may result in a reduction in the quality of the resulting images. One objective of some embodiments is to increase the performance of the fragment shader 55 by decreasing the precision of some of the fragment shader's registers and instructions to maintain a certain degree of quality of the image output.

Figure 2:
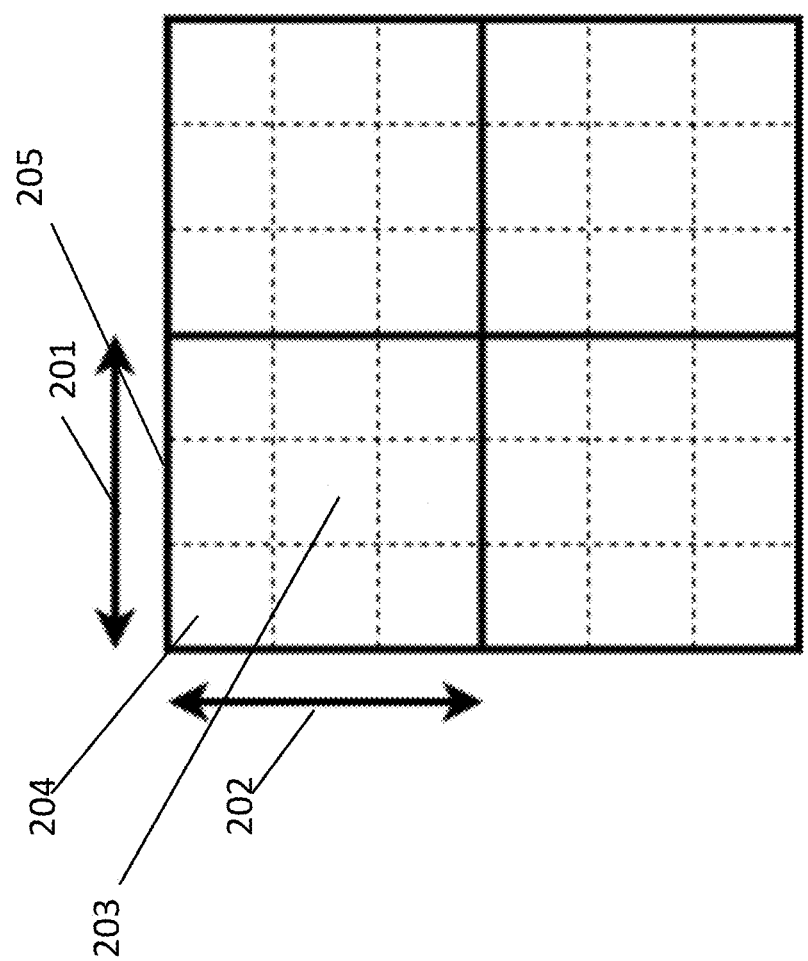
FIG. 2 is a schematic diagram showing a group of pixels grouped into one or more variable-precision groups for shading by a variable-precision shading (VPS) pipeline, according to an embodiment of the disclosure.

Reference is now made to FIG. 2, which shows a group of pixels in a variable-precision shading (VPS) pipeline. The pixels are grouped into one or more variable-precision groups 205. In FIG. 2, the variable precision group 205 has a width 201 of three pixels and a height 202 of three pixels, such that the variable precision group 205 comprises nine pixels. The variable-precision group may comprise any number of pixels and have any other height and/or width. The number of pixels in the variable-precision group 205 may affect performance. For example, the greater the number of pixels in each variable-precision group 205, the greater the efficiency of the fragment shader 55, but the greater the risk that image quality will be reduced. The performance of the variable-precision group 205 may depend on many factors. The size and dimensions of the variable-precision group 205 may be manually adjusted by the user to suit their particular use case. A pilot pixel 203 is chosen from the variable-precision group 205. The pilot pixel 203 is shown in FIG. 2 as the center pixel of the variable-precision group 205, but the pilot pixel 203 may be any pixel in the variable-precision group 205. The other pixels in the variable-precision group 205 are referred to as "commuter pixels" in that they follow a "pilot" pixel.

Figure 3:
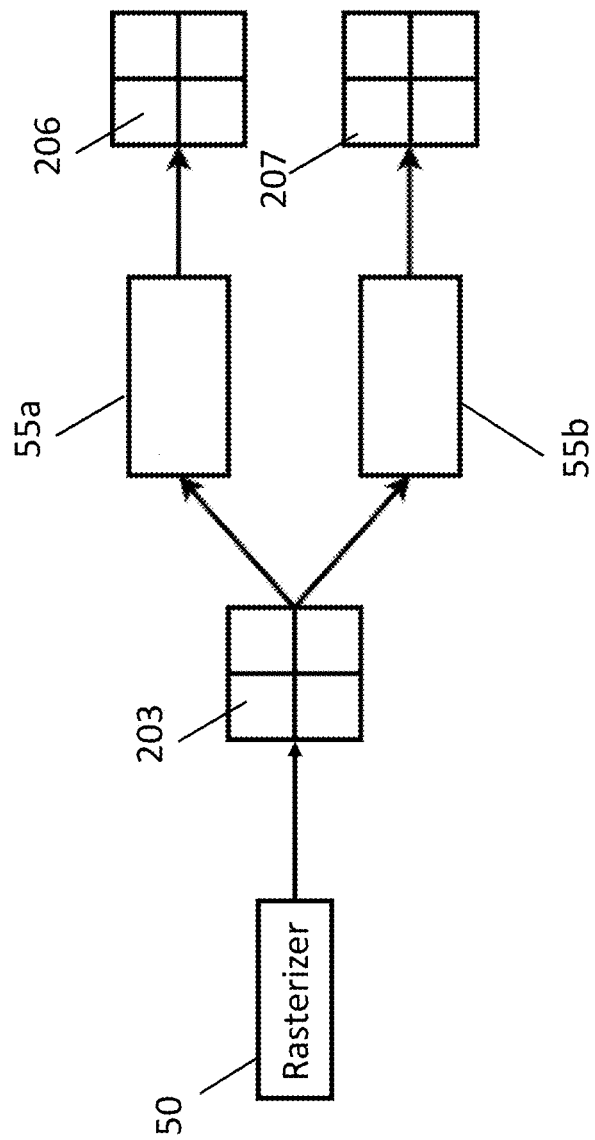
FIG. 3 is a schematic diagram of a VPS pipeline of the computing device shown in FIG. 1, according to an embodiment of the disclosure.

Reference is now made to FIG. 3, which shows a VPS pipeline having two fragment shaders 55*a* and 55*b*. The VPS pipeline in FIG. 3 follows rasterizer 50 and precedes fragment shader 55 in the rasterization pipeline. Fragment shader 55*a* is a regular precision fragment shader (RPFS), and fragment shader 55*b* is a low precision fragment shader (LPFS), such that the precision of some instructions and registers in the RPFS 55*a* is higher than those in the LPFS 55*b*. For example, the precision of a 32-bit multiply instruction and its 32-bit destination registers (% c32=mul32% a32, % b32) is lowered in the LPFS 55*b* to a 16-bit multiply instruction with a 16-bit destination register (% c16=mul16% a32, % b32). In some embodiments, the fragment shader 55*b* executes at least one of the instructions at a lower precision such that the LPFS 55*b* and the RPFS 55*a* are the same shader. For ease of presentation, the following description may consider that the fragment shader 55 comprises a LPFS 55*b* and a RPFS 55*a*.

The RPFS 55*a* may be used to generate an image with greater image fidelity than the LPFS 55*b*. For example, the RPFS 55*a* uses 32-bit floating-point registers and instructions to calculate the color of the pixel whereas the LPFS 55*b* uses 16-bit floating-point for the same registers and instructions. The RPFS 55*a* processes the pilot pixel 203 to produce a regular fidelity value for pixel 206. The LPFS 55*b* processes the pilot pixel 203 to produce a lower fidelity value for pixel 207. The pilot pixels of different variable-precision groups may be grouped together to be processed by the fragment shaders 55*a* & 55*b*. For example, FIG. 3 shows three other pilot pixels adjoining to pilot pixel 203.

Figure 4:
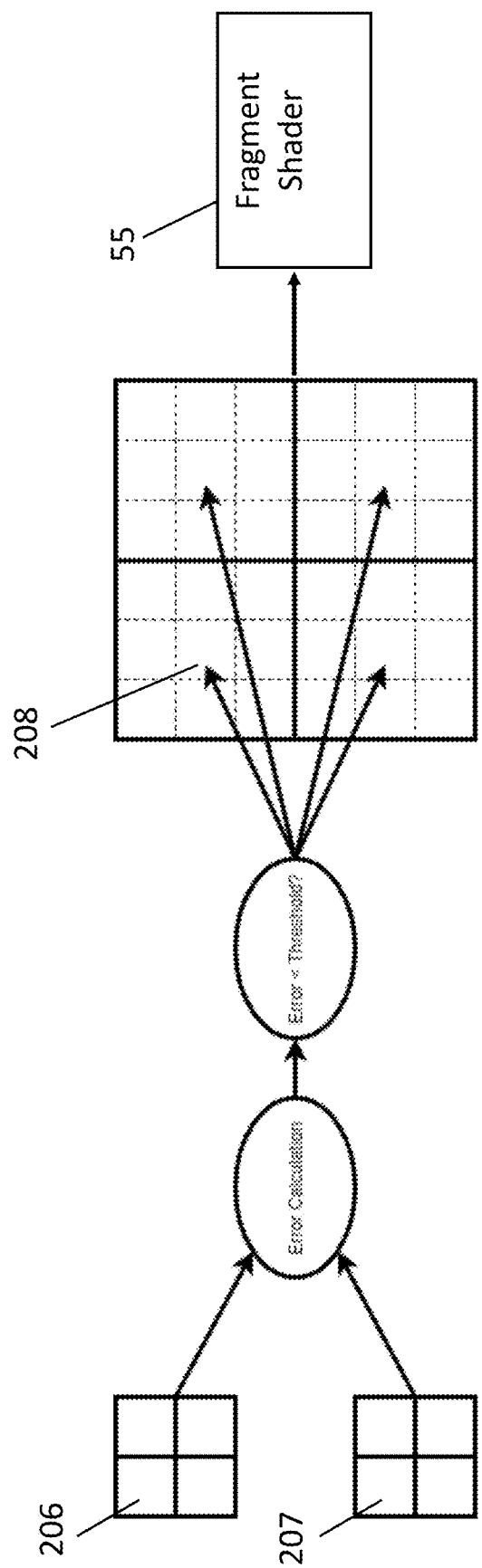
FIG. 4 is a schematic diagram of the error calculation portion of the VPS pipeline shown in FIG. 3, according to an embodiment of the disclosure.

Reference is now made to FIG. 4, which shows the error calculation step in the VPS pipeline. The regular fidelity pixel value 206 is compared to the lower fidelity pixel value 207 to determine whether the LPFS 55*b* would produce an image of acceptable fidelity. The image fidelity may be acceptable if the differences between the two values is less than an error threshold. In some embodiments, the pixel value may include values for one or more components (or color components) that represent the pixel. For example, the pixel value may be a vector for the red, green, and blue color values and the difference may be computed by the magnitude of the differences of the color vector, given by:

$$\text{error value} = \sqrt{D_R^2 + D_G^2 + D_B^2}$$

where $D_R$, $D_G$ & $D_B$ represent the difference of the red, green and blue values of the regular and lower fidelity pixels. The error value may also be computed by another formula (for example an alternate norm function or root-mean-squared-error). If the error value is less than an error threshold, then the LPFS 55*b* is chosen as the selected fragment shader. If the error value is greater than the error threshold, then the RPFS 55*a* is chosen as the selected fragment shader. The pilot pixel value 208 will be the LPFS pixel value 207, if the error value is less than the error threshold. The pilot pixel value 208 will be the RPFS pixel value 206 if the error value is greater than the error threshold. If the error value is equal to the error threshold, then either one of the LPFS 55*b* and RPFS 55*a*, and the corresponding value thereof, may be used. The optimal (or near-optimal) error threshold value will depend on many factors. The error threshold value may be manually adjustable by the user for their particular use case.

The fragment shader 55 processes the remaining commuter pixels in the variable-precision group 205 using the selected fragment shader. If the error value is less than the error threshold value, then all the commuter pixels are processed using the LPFS 55*b*. If the error value is greater than the error threshold value, then all the commuter pixels are processed using the RPFS 55*a*.

Figure 5:
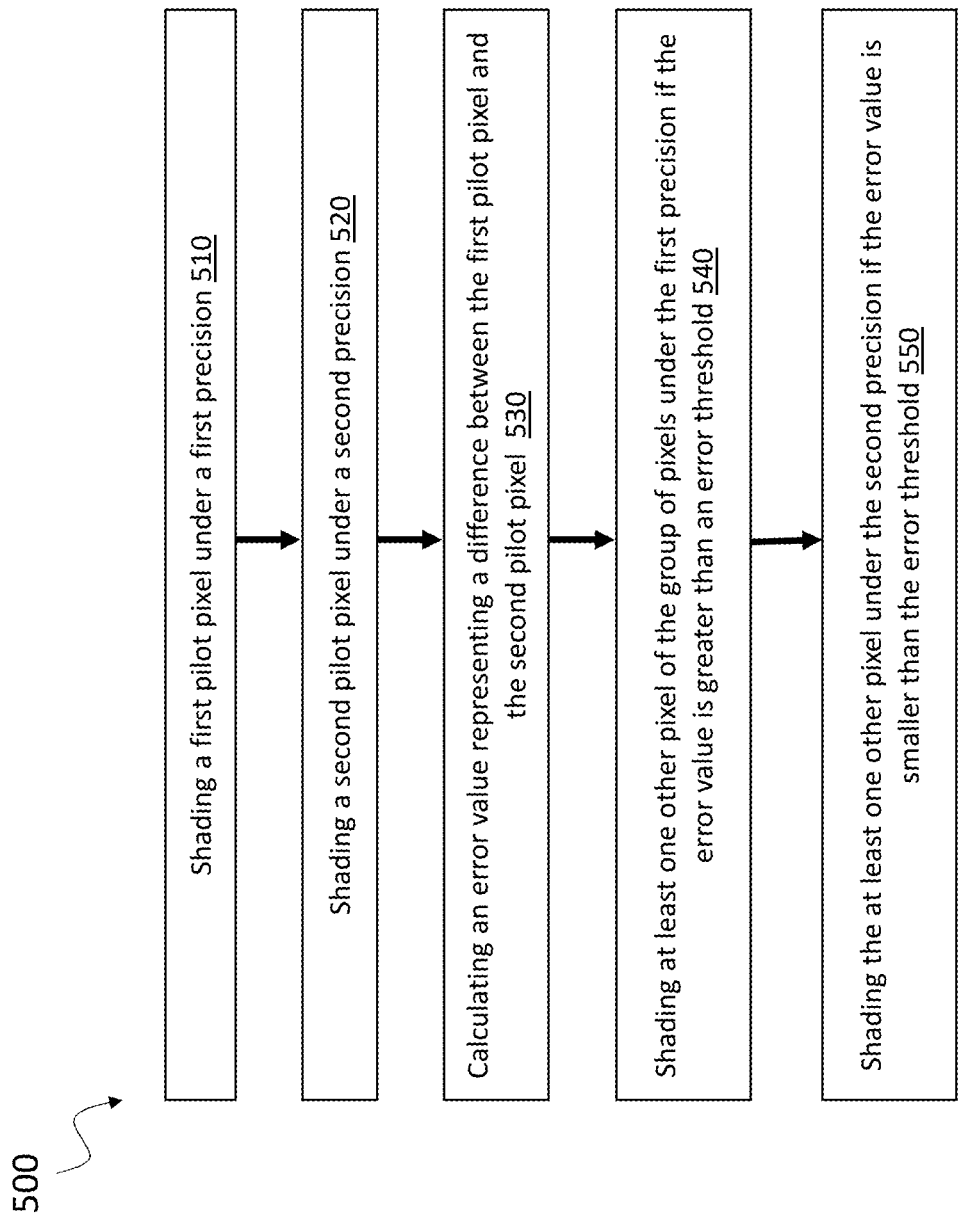
FIG. 5 is a flow diagram of a method of shading a variable-precision group of pixels performed by the VPS pipeline shown in FIG. 3, according to an embodiment of the disclosure.

Reference is now made to FIG. 5, which shows an exemplary method 500 for shading a variable-precision group of pixels 205 in the VPS pipeline and the fragment shader 55. The method 500 may be performed, for example, by computer device 100.

The method 500 comprises shading at least one first pilot pixel 203 of the group of pixels 205 under a first precision 510. This may comprise, for example, calculating the color of the first pilot pixel 203 using the RPFS 55*a*. The method 500 comprises shading at least one second pilot pixel 204 of the group of pixels 205 under a second precision 520. This may comprise, for example, calculating the color of the second pilot pixel 204 using the LPFS 55*b*. In this embodiment, two separate pilot pixels are used to reduce the overhead of running the fragment shader 55 twice on a single pixel. As a result, the fragment shader 55 does not need to be run twice for any given pixel, in particular the pilot pixel 203. The method 500 comprises calculating an error value representing a difference between the first 203 and second 204 pilot pixels 530. The method 500 comprises shading at least one other pixel of the group of pixels using the RPFS 55*a* if the error value is greater than an error threshold 540, and shading the at least one other pixel using the LPFS 55*b* if the error value is smaller than the error threshold 550. If the error value is greater than the error threshold, then the image fidelity would likely not be sufficient if the LPFS 55*b* were used. Consequently, the RPFS 55*a* should be used on the remaining commuter pixels in the variable-precision group 205. If the error value is smaller than the error threshold, then the image fidelity would likely be sufficient if the LPFS 55*b* were used. Consequently, the LPFS 55*b* should be used on the remaining commuter pixels of the variable-precision group 205 to improve the efficiency of the fragment shader 55.

Optionally, the first pilot pixel 203 and the second pilot pixel 204 are neighboring pixels. As shown in FIG. 2, the two pilot pixels may be adjoining to one another. Alternatively, they may not be adjoining to one another. As another option, the first pilot pixel 203 and the second pilot pixel 204 are the same pixel. That is, there is only one pilot pixel 203, and both fragment shaders 55a and 55b are run on the same pilot pixel 203.

Optionally, shading the at least one first pilot pixel 203 is performed by the RPFS 55a, and shading the at least one second pilot pixel 204 is performed by the LPFS 55b. Furthermore, shading the at least one first pilot pixel 203 comprises obtaining a first color value, and shading the at least one second pilot pixel 204 comprises obtaining a second color value. As described, the color value may represent one or more color values for one or more color components (e.g. red, green, blue).

Optionally, there may exist a spatial relationship among at least two pixels of the group of pixels 205. Generally, there is a spatial relationship between the pixels of the variable-precision group 205. For example, the pixels of the variable-precision group 205 may be adjoining to one another in the image. This ensures that information about the commuter pixels may be inferred from the pilot pixel 203. For example, if it is necessary to use the RPFS 55a on the pilot pixel 203, then it will likely be necessary to use the RPFS 55a on the commuter pixels. Likewise, if it is possible to use the LPFS 55b on the pilot pixel 203, then it will likely be possible to use the LPFS 55b on the commuter pixels while maintaining the image fidelity.

Optionally, calculating the error value comprises calculating the magnitude of the difference between the first pilot pixel value 203 and the second pilot pixel value 204. The first pilot pixel 203 may have a first color value (for example, between 0 and 255) comprising three integer or floating-point color channels and the second pilot pixel 204 may have a second color value (for example, between 0 and 255) comprising three integer or floating-point color channels. Calculating the magnitude of the difference between the first pilot pixel 203 and the second pilot pixel 204 comprises calculating the magnitude of the difference between the first color value and the second color value.

Optionally, the RPFS 55a outputs the at least one non-color value, the LPFS 55b computes the at least one non-color value using some lower precision registers and instructions, and calculating the error value comprises calculating the difference between the at least one non-color values output by the RPFS 55a and the LPFS 55b. For example, the RPFS 55a may output a heatmap value computed with 32-bit precision registers and instructions, the LPFS 55b may compute the value using 16-bit precision registers and instructions, and the error value is their absolute difference.

Optionally, the variable-precision group of pixels 205 may have any dimensions. For example, the variable-precision group of pixels 205 may have the following dimensions 3 pixels by 3 pixels, 2 pixels by 2 pixels, 1 pixel by 5 pixels, or 3 pixels by 2 pixels. As another option the shape of the variable-precision group of pixels 205 may be a rectangle, a square, a circle, or a triangle.

Optionally, a number of different features and aspects of, or associated with, the VPS pipeline may be user customizable. For example, the error threshold value may be user customizable. The sensitivity of a calculation to the precision of its operations is difficult to predict. For example, a division of a large floating-point value by a very small floating-point value is a situation known to be sensitive to changes in precision. By making the error threshold value user customizable, the user may increase and decrease the error threshold value to test which value is required to increase performance and maintain image fidelity. Optionally, the formula for calculating the error value is user customizable. For example, the user may change the formula to a formula other than a magnitude of differences calculation. Optionally, the first pilot pixel 203 or the second pilot pixel 204 may be user customizable. That is the user may be able to select which pixel in the variable-precision group 205 to use as the pilot pixel. The pilot pixel may be a center pixel, a corner pixel, a side pixel, or any other pixel of the group of pixels 205. Optionally, the size of the variable-precision group 205 of pixels may be user customizable. For example, the user may be able to adjust the dimensions and/or the number of pixels contained in a single variable-precision group 205.

Optionally, the RPFS 55a and the LPFS 55b may be combined into a single fat-shader and the shading operation performed by the fragment shaders 55a, 55b may be combined into a single step. A fat shader processes more than one pixel per thread. In contrast, a non-fat shader processes only a single pixel per thread. A fat shader runs once per variable-precision group of pixels rather than once per pixel. In some embodiments, the processes described herein may be implemented within a fat shader. In this case, the fat shader will contain both the RPFS 55a and the LPFS 55b. Once the pixels have been grouped into variable-precision groups, the fat shader will be run once per variable-precision group 205. The fat shader, in a single thread, will run the RPFS 55a on the at least one pilot pixel 203 and the LPFS 55b on the at least one pilot pixel 204, perform the error calculation, and process the remaining commuter pixels using the selected shader.

Optionally, the LPFS 55b and the RPFS 55a may be the same module and a precision signal input determines the precision of some registers and instructions thereof. The change in the precision thereof may be performed directly by the fragment shaders 55a and 55b wherein the precision signal lowers the precision of some regular precision registers and instructions thereof.

Optionally, the at least one first pilot pixel 203 comprises a plurality of pixels, and the at least one second pilot pixel 204 comprises a plurality of pixels. That is, the error value of more than one pair of pilot pixels may be tested with the error threshold to increase the confidence of the shader selection and to reduce the risk of unacceptably low image fidelity. This option results in extra overhead due to running the fragment shaders 55a and 55b on more of the pixels in the variable-precision group 205.

Figure 6:
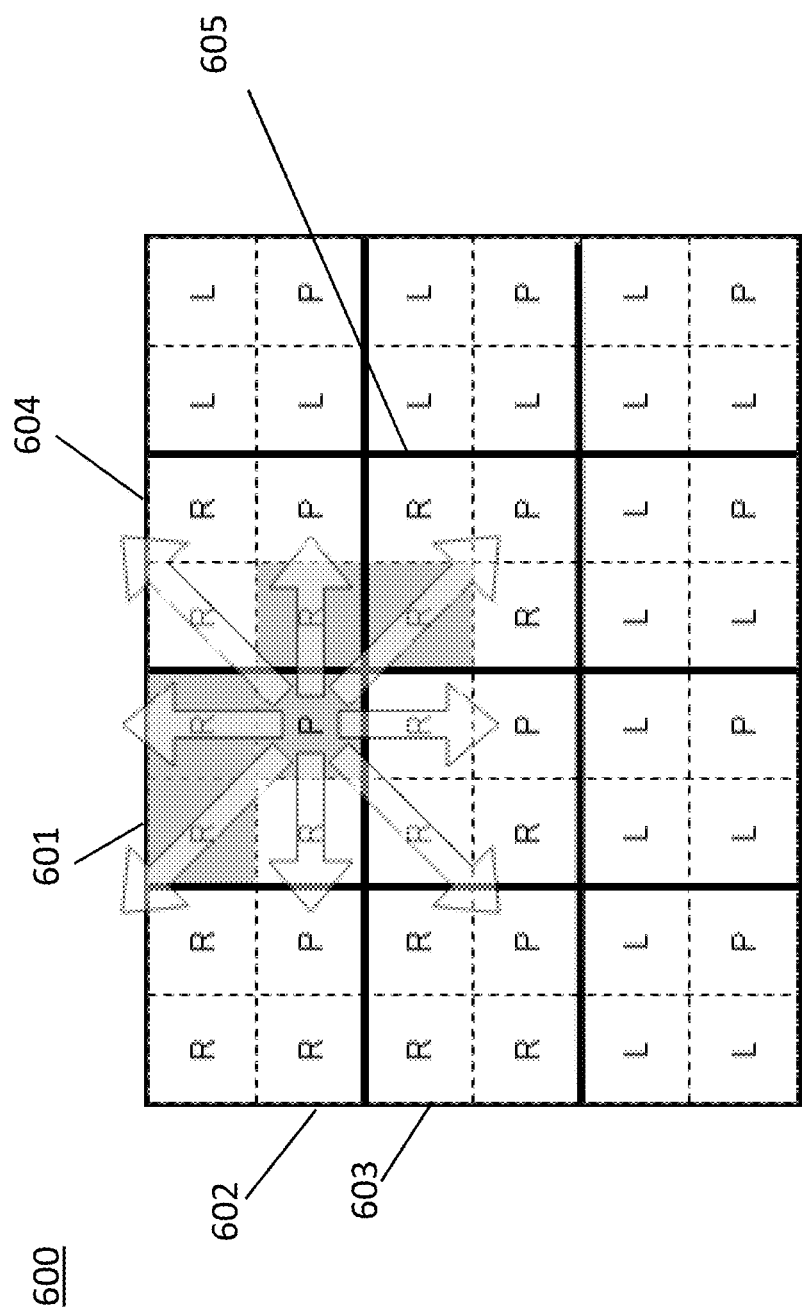
FIG. 6 is a schematic diagram of a group of pixels grouped into one or more variable-precision groups and shaded by the VPS pipeline shown in FIG. 3, according to an embodiment of the disclosure.

Reference is now made to FIG. 6, which shows a diagram 600 of another embodiment of the present invention. FIG. 6 shows neighbouring pixel groups 601-605. In this case, the RPFS 55a and the LPFS 55b are both run on the pilot pixel of variable-precision group 601. The error value exceeds the error threshold value, such that the RPFS 55a is selected for the remaining commuter pixels of the variable-precision group 601. In this embodiment, the RPFS 55a is then used to process all the pixels of the neighbouring variable-precision groups 602, 603, 604, and 605, regardless of whether the error values exceed the error threshold for the pilot pixels in those neighbouring variable-precision groups. This reduces the performance of fragment shading by using the RPFS 55a where the LPFS 55b could be used. However, this embodiment increases image fidelity and reduces the risk of unacceptably low image fidelity. Performance could potentially be improved by not testing the pilot pixels in the neighbouring variable-precision groups 602-605, and thus reducing the overhead of otherwise running both fragment shaders 55a and 55b for the neighbouring variable-precision groups 602-605.

In some embodiments, performance may be further improved by reusing the results of testing the pilot pixels across frames. In a first frame, the pilot pixel 203 of a variable-precision group 205 is tested by shading it with the RPFS 55a and the LPFS 55b. A fragment shader 55a or 55b is selected based on whether the error value exceeds the error threshold. The selected fragment shader 55a or 55b is then used to process the remaining commuter pixels in the variable-precision group 205. Motion vectors are used to project the pixels of the variable-precision group 205 into a second frame. The projected pixels in the second frame are processed using the same selected fragment shader 55a or 55b. It is not necessary to re-test the pilot pixel in the second frame. This may be done for each variable-precision group in the second frame. This embodiment increases performance by reducing the overhead of otherwise running both fragment shaders 55a and 55b for each pilot pixel in the second frame.

The RPFS 55a and LPFS 55b may be implemented as hardware components. However, those skilled in the art will appreciate that, in various embodiments, the fragment shaders 55a and 55b may be implemented using any suitable manner such as implemented as hardware components, software components, or a combination thereof. Moreover, in some embodiments, the RPFS 55a and LPFS 55b may be separate hardware or software shaders implemented as hardware components or software components with one operating in high precision and the other in low precision. The RPFS 55a and LPFS 55b may be separate hardware shaders. Alternatively, the RPFS 55a and LPFS 55b may be separate software shaders. Yet alternatively, one of the RPFS 55a and LPFS 55b may be a hardware shader and the other thereof may be a software shader.

In some other embodiments, the RPFS 55a and LPFS 55b may be the same hardware or software shader with adjustable precisions, for example, under the instructions of input precision-signals, to act as the RPFS 55a and LPFS 55b as needed.

In embodiments where the RPFS 55a and LPFS 55b are implemented as software shaders (that is shading programs or program modules executed by a suitable hardware component (denoted a "fragment shader processor")), performance may be improved by statically analyzing the best-case (or improved-case) speedup at compile time of the fragment shader processor. After compilation of RPFS 55a and LPFS 55b, an analysis may be performed to determine what the best-case speedup would be for the fragment shader processor. The best-case speedup for the fragment shader processor could be, for example, if all the precision pixel groups were processed using the LPFS 55b. If the best-case speedup does not meet a minimum threshold, then the fragment shader processor will default to always using the RPFS 55a. If the best-case speedup does meet or exceed the minimum threshold, then the RPFS or the LPFS may be selected for the fragment shader processor depending on a test run on the pilot pixel, as in the other embodiments disclosed herein. This may increase the performance of the fragment shader processor by removing the overhead of running the fragment shaders 55a & 55b on pilot pixels where this is not warranted by the potential gain of using the LPFS 55b. Since this check is performed at compile time, it has no effect on the runtime performance of the fragment shader processor.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification may be implemented or combined with any part of any other aspect or embodiment discussed in this specification.

The invention claimed is:

1. A method for shading a group of pixels in a raster graphics pipeline, comprising:
   shading at least one first pilot pixel of the group of pixels under a first precision to obtain a first color value;
   shading at least one second pilot pixel of the group of pixels under a second precision that is lower than the first precision to obtain a second color value;
   calculating an error value representing a magnitude of a difference between the first color value and the second color value;
   shading at least one other pixel of the group of pixels under the first precision if the error value exceeds an error threshold; and
   shading the at least one other pixel under the second precision if the error value does not exceed the error threshold.

2. The method of claim 1, wherein the first pilot pixel and the second pilot pixel are neighboring pixels.

3. The method of claim 1, wherein the first pilot pixel and the second pilot pixel are the same pixel.

4. The method of claim 1, wherein shading the at least one first pilot pixel under a first precision comprises using a first fragment shader having at least one first-precision register and instruction to shade the at least one first pilot pixel; and wherein shading the at least one second pilot pixel under a second precision comprises using a second fragment shader having at least one second-precision register and instruction to shade the at least one second pilot pixel.

5. The method of claim 4, wherein the first fragment shader and the second fragment shader are combined into a single fat shader.

6. The method of claim 4, wherein the first and second fragment shaders are a same fragment shader that is configured to receive different input precision-signals.

7. The method of claim 1, wherein there exists a spatial relationship among at least two pixels of the group of pixels.

8. The method of claim 1, wherein the group of pixels comprises 3 pixels by 3 pixels, 2 pixels by 2 pixels, 1 pixel by 5 pixels, or 3 pixels by 2 pixels.

9. The method of claim 1, wherein a shape of the group of pixels is a rectangle, square, circle, or triangle.

10. The method of claim 1, wherein at least one of the error threshold, and a formula for calculating the error value, is user customizable.

11. The method of claim 1, wherein a location of the first pilot pixel or the second pilot pixel is user customizable.

12. The method of claim 1, wherein a size of the group of pixels is user customizable.

13. The method of claim 1, wherein the first pilot pixel is within a central portion of the group of pixels, a corner pixel of the group of pixels, or a side pixel of the group of pixels.

14. The method of claim 1, wherein:
   said shading the at least one other pixel of the group of pixels under the first precision if the error value exceeds the error threshold comprises shading all other pixels of the group of pixels under the first precision if the error value exceeds the error threshold; and said shading the at least one other pixel under the second precision if the error value does not exceed the error threshold comprises shading all the other pixels of the group of pixels under the second precision if the error value does not exceed the error threshold.

15. The method of claim 1, wherein the at least one first pilot pixel comprises a plurality of pixels, and the at least one second pilot pixel comprises a plurality of pixels.

16. A non-transitory computer-readable medium comprising computer program code stored thereon for shading a group of pixels in a raster graphics pipeline, wherein the code, when executed by one or more processors, causes the one or more processors to perform a method comprising:

shading at least one first pilot pixel of the group of pixels under a first precision to obtain a first color value;

shading at least one second pilot pixel of the group of pixels under a second precision that is lower than the first precision to obtain a second color value;

calculating an error value representing a magnitude of a difference between the first color value and the second color value;

shading at least one other pixel of the group of pixels under the first precision if the error value exceeds an error threshold; and shading the at least one other pixel under the second precision if the error value does not exceed the error threshold.

17. A computing device comprising one or more processors operable to perform a method for shading a group of pixels in a raster graphics pipeline, wherein the method comprises:

shading at least one first pilot pixel of the group of pixels under a first precision to obtain a first color value;

shading at least one second pilot pixel of the group of pixels under a second precision that is lower than the first precision to obtain a second color value;

calculating an error value representing a magnitude of a difference between the first color value and the second color value;

shading at least one other pixel of the group of pixels under the first precision if the error value exceeds an error threshold; and shading the at least one other pixel under the second precision if the error value does not exceed the error threshold.

\* \* \* \* \*